US010112460B2

(12) United States Patent
Komatsubara (10) Patent No.: US 10,112,460 B2
(45) Date of Patent: Oct. 30, 2018

(54) HUMIDIFIER (71) Applicant: DENSO CORPORATION, Kariya, Aichi-pref. (JP)

(72) Inventor: Yusuke Komatsubara, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 113 days.

(21) Appl. No.: 15/325,553

(22) PCT Filed: Aug. 6, 2015

(86) PCT No.: PCT/JP2015/003957
§ 371 (c)(1),
(2) Date: Jan. 11, 2017

(87) PCT Pub. No.: WO2016/027429
PCT Pub. Date: Feb. 25, 2016

(65) Prior Publication Data
US 2017/0136851 A1 May 18, 2017

(30) Foreign Application Priority Data

Aug. 21, 2014 (JP) ................................ 2014-168799
Jul. 6, 2015 (JP) ................................ 2015-135453

(51) Int. Cl.
B60H 3/02 (2006.01)
F24F 3/14 (2006.01)
(Continued)

(52) U.S. Cl.
CPC .............. B60H 3/02 (2013.01); B01D 53/04 (2013.01); F24F 3/1411 (2013.01); B60H 2003/026 (2013.01); F24F 6/04 (2013.01)

(58) Field of Classification Search
CPC ... B60H 3/01; B60H 2003/026; F24F 3/1411; F24F 6/04; B01D 53/04
(Continued)

(56) References Cited

U.S. PATENT DOCUMENTS 4,594,860 A * 6/1986 Coellner ............... F24F 3/1423
165/10
2010/0107673 A1 5/2010 Nakaguro et al.
(Continued)

FOREIGN PATENT DOCUMENTS

JP S50079241 U 7/1975
JP S57153925 U 9/1982
(Continued)

Primary Examiner — Frank M Lawrence, Jr.
(74) Attorney, Agent, or Firm — Harness, Dickey & Pierce, P.L.C.

(57) ABSTRACT

A humidifier supplies humidified air, which is humidified by water desorbed from an adsorbing material, to a humidification object space. The humidifier includes: a heating part that heats air, which is supplied to the adsorbing material; an adsorbing material module that includes the adsorbing material and that desorbs water, which is adsorbed in the adsorbing material, to air heated by the heating part; and a cooling part that cools air humidified by the adsorbing material module. At time of desorption to desorb water from the adsorbing material, the adsorbing material module desorbs water from the adsorbing material to air heated by the heating part, and then the cooling part cools the air to be supplied to the humidification object space as the humidified air. At time of adsorption to adsorb water of air into the adsorbing material, the cooling part cools air, and then water is adsorbed into the adsorbing material.

5 Claims, 8 Drawing Sheets (51) Int. Cl.
*B01D 53/04* (2006.01)
*F24F 6/04* (2006.01)

(58) Field of Classification Search
USPC ....... 96/143, 146, 108, 152; 95/117; 62/271; 34/472, 473, 80
See application file for complete search history.

(56) References Cited

U.S. PATENT DOCUMENTS

| | | | |
|---|---|---|---|
| 2013/0036913 A1* | 2/2013 | Fukudome | F24F 3/1423 96/118 |
| 2014/0338883 A1* | 11/2014 | Watanabe | B60H 3/024 165/287 |
| 2016/0054013 A1* | 2/2016 | Komatsubara | F24F 6/08 62/271 |

FOREIGN PATENT DOCUMENTS

| | | |
|---|---|---|
| JP | 2001239827 A | 9/2001 |
| JP | 2002228189 A | 8/2002 |
| JP | 2005106353 A | 4/2005 |
| JP | 2006213090 A | 8/2006 |
| JP | 2008100144 A | 5/2008 |
| JP | 2010249485 A | 11/2010 |
| JP | 2011043311 A | 3/2011 |
| JP | 5266657 B2 | 8/2013 |

* cited by examiner

HUMIDIFIER

CROSS REFERENCE TO RELATED APPLICATIONS

This application is a U.S. National Phase Application under 35 U.S.C. 371 of International Application No. PCT/JP2015/003957 filed on Aug. 6, 2015 and published in Japanese as WO 2016/027429 A1 on Feb. 25, 2016. This application is based on and claims the benefit of priority from Japanese Patent Application No. 2014-168799 filed on Aug. 21, 2014 and Japanese Patent Application No. 2015-135453 filed on Jul. 6, 2015. The entire disclosures of all of the above applications are incorporated herein by reference.

TECHNICAL FIELD

The present disclosure relates to a humidifier that provides humidified air for a room interior.

BACKGROUND ART

Patent Document 1 discloses a mode of a dehumidification and humidification device for a vehicle that supplies humidified air to an occupant in a vehicle interior. The device described in Patent Document 1 includes an adsorption element that is obtained by supporting an adsorbing material with an element which can ventilate air, a heater that is disposed on the non-ventilation surface of the adsorption element to directly heat the adsorption element, and a blower that can rotate forward and backward.

During winter periods in which the outside air is dry, for example, the air in a room interior is introduced into the adsorption element by rotating the blower in one direction with the energization of the heater stopped. In this case, the adsorbing material has ordinary temperature, and thus the adsorption element fulfills a adsorbing function of removing water from the air passing through the adsorption element, so that the dehumidified air is blown out to the room interior. After this adsorbing operation is carried out for a certain time, the heater is then energized and the adsorption element is heated by the heater. In response to the energization of the heater, the rotational direction of the blower is reversed to blow air in a reverse direction. Since the water desorbed from the adsorption element is contained in the blown air, humidified air is supplied to the room interior.

The water desorption from the adsorption element requires that the temperature of the adsorption element should rise or that the air having a low relative humidity should flow into the adsorption element.

As described above, at the time of desorption, the energization of the heater is begun to start heating the adsorption element. Thus, the temperature of the adsorption element cannot rise quickly at the time of desorption, taking time to increase the temperature of the adsorption element to a target temperature. The heating output of the heater needs to be made large to tentatively quickly increase the temperature of the adsorption element.

The adsorption element that has taken time to increase its temperature at the time of desorption, when switched to the adsorption mode, gradually decreases in temperature due to the stop of the energization of the heater. Thus, the adsorbing material takes time to be decreased in temperature to a target temperature. At the time of switching between desorption and adsorption, the temperature and humidity of humidified air and dehumidified air change gently similar to the temperature change of the adsorption element.

PRIOR ART DOCUMENT

Patent Document

Patent Document 1: JP5266657B

As described above, the device in Patent Document 1 heats the adsorption element by starting the energization of the heater, and thus takes time to increase the temperature of the adsorption element to a predetermined temperature at the time of desorption. By stopping the energization of the heater, the temperature of the adsorption element consequently decreases. Thus, it takes time to decrease the temperature of the adsorption element to a predetermined temperature at the time of adsorption. This raises the issue that the temperature responsiveness and humidity responsiveness at the time of switching relating to the desorption and adsorption deteriorate to impair the user's comfort.

In the device in Patent Document 1, the adsorption element is heated directly by the heater. Thus, the water desorbed from the adsorption element is supplied directly to the user together with air. Therefore, warm humidified air is blown out to the user, so that the user may have a sense of discomfort.

SUMMARY OF INVENTION

The present disclosure addresses the above issues. Thus, it is an objective of the present disclosure to provide a humidifier that can improve temperature and humidity responsiveness at the time of switching between adsorption and desorption.

To achieve the objective, the present disclosure employs the following technical means.

In an aspect of the present disclosure, a humidifier is for supplying humidified air, which is humidified by water desorbed from an adsorbing material, to a humidification object space. The humidifier includes: a heating part that heats air, which is supplied to the adsorbing material; an adsorbing material module that includes the adsorbing material and that desorbs water, which is adsorbed in the adsorbing material, to air heated by the heating part; and a cooling part that cools air humidified by the adsorbing material module. At time of desorption to desorb water from the adsorbing material, the adsorbing material module desorbs water from the adsorbing material to air heated by the heating part, and then the cooling part cools the air to be supplied to the humidification object space as the humidified air. At time of adsorption to adsorb water of air into the adsorbing material, the cooling part cools air, and then water is adsorbed into the adsorbing material.

In this aspect, at the time of desorption, the air before being supplied to the adsorbing material module is heated by the heating part. Thus, the temperature of this air can rise quickly. Moreover, the relative humidity of air can be lowered promptly by the quick air temperature rise. Consequently, the water desorption at the adsorbing material module can be activated to promptly make high the relative humidity of the air after flowing out of the adsorbing material module.

On the other hand, at the time of adsorption, the air before being supplied to the adsorbing material module is cooled by the cooling part. Thus, the temperature of this air can reduce quickly. Moreover, the relative humidity of air can be made high promptly by the quick air temperature reduction. Consequently, the water adsorption at the adsorbing material module can be activated to promptly make low the relative humidity of the air after flowing out of the adsorbing material module. In this manner, the humidifier can remarkably improve the temperature responsiveness and humidity responsiveness relating to the air after flowing out of the adsorbing material module as compared with the conventional art both at the time of desorption and at the time of adsorption. Thus, this aspect can provide the humidifier that can improve temperature and humidity responsiveness at the time of switching between adsorption and desorption.

At the time of desorption, the cooling part used at the time of adsorption cools the air, which has passed through the adsorption element to be humidified. Thus, the cool humidified air is blown out to the user, so that a comfortable feeling can be provided for the user.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments will be described below with reference to the accompanying drawings. In each embodiment, to a part corresponding to the part described in the preceding embodiment, the same reference numeral may be given so as to omit a repeated description. In a case of description of only a part of configuration in each embodiment, a configuration in another embodiment explained ahead of the embodiment can be applied to the other part of the configuration. In the embodiments, in addition to combination between parts which are specifically shown to be combinable, embodiments can be combined partially with each other even if not expressly shown as long as the combination does not particularly create problems.

(First Embodiment)

Figure 1:
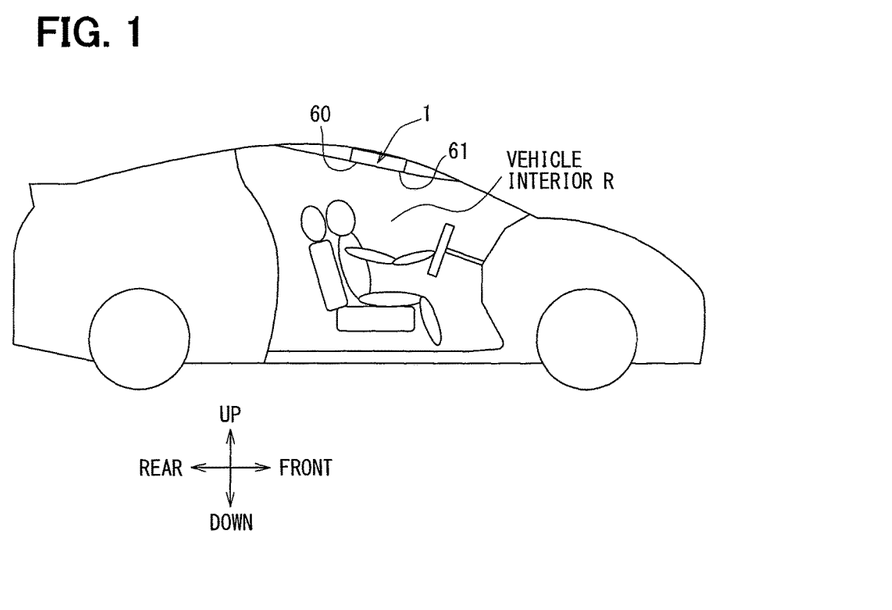
FIG. 1 is a schematic diagram illustrating a position where a humidifier is disposed in a vehicle in accordance with a first embodiment.

A humidifier of the present disclosure is a device that is attached to an interior member in the room, and is a device that humidifies the inside of the room as its object space. As an example of the humidifier, each of the following embodiments describes the case of application of the humidifier to a vehicle as illustrated in FIG. 1. Thus, a humidifier 1 disposed in a vehicle humidifies a vehicle interior R as its object space. The vehicle having the humidifier 1 includes an air conditioner for a vehicle that regulates the temperature of the vehicle interior R.

Figure 2:
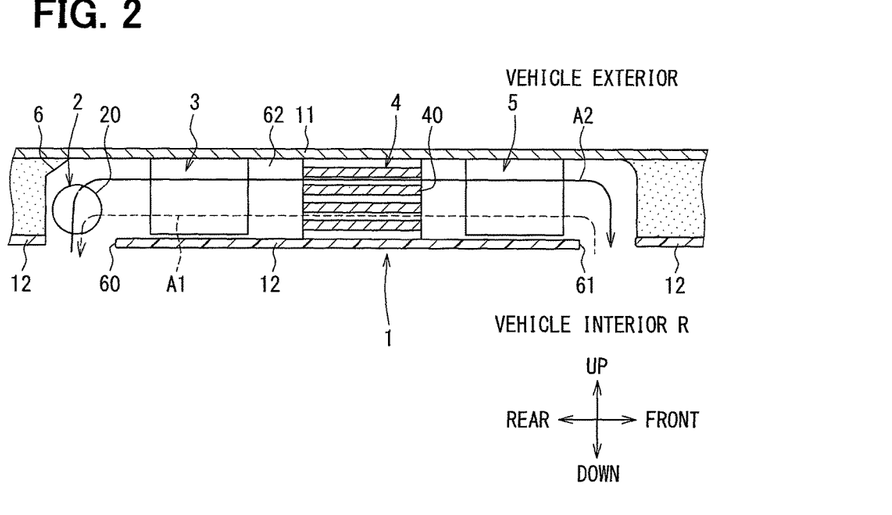
FIG. 2 is a sectional view illustrating a general configuration of the humidifier of the first embodiment.

As illustrated in FIGS. 1 and 2, the humidifier 1 is disposed on the ceiling of the vehicle. The arrows UP, DOWN, FRONT, and REAR illustrated in FIGS. 1 and 2 indicate respective directions in a state where the humidifier 1 is disposed in the vehicle. Thus, the upper side, lower side, front side, and rear side are the upper side, lower side, front side, and rear side of the vehicle, respectively. The humidifier 1 is configured to accommodate a blower 2, a heating unit 3, an adsorbing material module 4, a cooling unit 5, and so forth in a casing 6 that is configured as a outer shell of the humidifier 1.

In the humidifier 1, the heating unit 3, the adsorbing material module 4, and the cooling unit 5 are arranged in this order in a direction A2 in which air flows at the time of desorption when water desorbs from an adsorption element, as illustrated in FIG. 2. Thus, at the time of desorption, the vehicle-interior air introduced from a first opening 60 is heated by the heating unit 3, and then water is added to the air through the adsorbing material module 4. Furthermore, the air is cooled by the cooling unit 5, and is then blown out into the vehicle room through a second opening 61. The air flow at the time of this desorption is indicated by an arrowed continuous line in FIG. 2.

In the humidifier 1, the cooling unit 5, the adsorbing material module 4, and the heating unit 3 are arranged in this order in a direction A1 in which air flows at the time of adsorption when water is adsorbed into the adsorption element. Thus, at the time of adsorption, the vehicle-interior air introduced from the second opening 61 is cooled by the cooling unit 5, and then releases water through the adsorbing material module 4. Furthermore, the air is heated by the heating unit 3, and then is blown out into the vehicle room through the first opening 60. The air flow at the time of this adsorption is indicated by an arrowed short dashes line in FIG. 2.

In the example illustrated in FIG. 2, the blower 2 is disposed at the position closer to the first opening 60 than the other devices, but the setting position of the blower 2 is not limited to this position. Thus, the lower 2 can be disposed at an arbitrary position in an air passage 62 under the roof formed between the first opening 60 and the second opening 61.

The blower 2 is an electric blower that rotates an axial fan 20 by an electric motor. The blower 2 is an air-blowing part whose operation rate, i.e., rotation speed or blown air amount is controlled by the control voltage outputted from a control device. When the rotation direction of the electric motor is switched by the control device, the blower 2 is configured such that the flow direction of its blown air can be switched to the opposite direction.

For example, when the control device rotates the electric motor forward, the blown air flows as indicated by the arrowed continuous line in FIG. 2. The air in the vehicle interior is drawn into the air passage 62 of the casing 6 through the first opening 60, and flows through the heating unit 3, the adsorbing material module 4, and the cooling unit 5 in this order to become humidified air, being blown out through the second opening 61 toward the upper body of an occupant seated on the front seat in the vehicle interior.

In contrast, when the control device rotates the electric motor reversely, the blown air flows as indicated by the arrowed short dashes line in FIG. 2. The air in the vehicle interior is drawn into the air passage 62 of the casing 6 through the second opening 61, and flows through the cooling unit 5, the adsorbing material module 4, and the heating unit 3 in this order to become dehumidified air, being blown out through the first opening 60 toward the rear seat in the vehicle interior.

The casing 6 is formed in a box-shape from resin or metal, and defines therein the air passage 62 through which the blown air blown by the blower 2 flows. The thickness size of the casing 6 in the up and down directions is almost the same as the thickness size of an interior member 12 that is attached on the vehicle interior-side of a vehicle top plate 11, and the casing 6 is formed in a thin rectangular parallelepiped shape extending along the vehicle top plate 11.

At least two openings through which the blown air flows in and out between the vehicle interior R and the air passage 62 are formed on the lower surface of the casing 6, i.e., on the surface of the casing 6 on vehicle interior-side. The second opening 61 of these openings that is disposed on the vehicle front side opens toward the upper body of the occupant seated on the front seat of the vehicle. The first opening 60 that is disposed on the vehicle rear side opens toward the rear seat. For example, a mesh filter with relatively small ventilation resistance is disposed over each of the first opening 60 and the second opening 61 to be capable of restricting foreign substances from flowing into the air passage 62 in the casing 6.

The adsorbing material module 4 arranges by stacking metal plate-shaped members 40 supporting adsorbing materials at intervals, and includes passages through which the blown air passes between the plate-shaped members 40. In the adsorbing material module 4 of this embodiment, the plate-shaped members 40 supporting the adsorbing materials are stacked and arranged as above to be capable of increasing the contact area between the blown air and the adsorbing material. For the adsorbing material, the adsorbing material module 4 employs a polymer adsorbing material such as silica gel, or a moisture adsorbing material such as zeolite, which is obtained by drying gelatinous soft mud to form a polyhedron.

The heating unit 3 is a heating part that can heat the air flowing through the air passage 62 in the casing 6. The heating unit 3 can employ various methods as its heating method as long as they are configured to be capable of heating air. A device having a heat generator that produces heat upon energization, or a device that heats the air in the room through heat exchange between a medium having higher temperature than the air in the room, and air can be used for the heating unit 3. The heating unit 3 is, for example, a device having a nichrome-wire heater or a positive temperature coefficient (PTC) heater, or a heat exchanger. Warm water, refrigerant, engine coolant, or a heat generator such as an electronic component that produces heat in the vehicle can be adopted for the medium having higher temperature than the air, which is used for the heat exchanger.

The cooling unit 5 is a cooling part that can cool the air flowing through the air passage 62 in the casing 6. The cooling unit 5 can employ various methods as its cooling method as long as they are configured to be capable of cooling air. A device having a Peltier element that absorbs heat upon energization, or a device that cools the air in the room through heat exchange between a medium having lower temperature than the air in the room, and air can be used for the cooling unit 5. The cooling unit 5 is, for example, a thermo module having a Peltier element, or a heat exchanger. For example, outside air, conditioned air, refrigerant flowing through the refrigeration cycle used in an air conditioner can be adopted for the medium having lower temperature than the air, which is used for the heat exchanger.

There is a heat sink for the heat exchanger that uses outside air as a low-temperature medium. The heat sink is a heat transfer member including fins formed from metal with excellent heat conductivity, such as aluminum or copper. The heat sink is attached to, for example, the vehicle top plate 11. The heat sink achieves a function of transferring the temperature of outside air of the vehicle exterior to the air passage 62 in the casing 6. The heat sink can exchange heat between the outside air of the vehicle exterior and the blown air flowing through the air passage 62 in the casing 6. This heat sink is configured as a cooling part that releases the cold heat of outside air to the blown air in the vehicle interior to cool the blown air, or as a cooling part that releases the heat of blown air to the outside air to cool the blown air.

The control device is configured by a microcomputer including a CPU, a ROM, and a RAM and its peripheral circuit, and controls the operation of the blower 2 connected to the output side of the control device. The control device may control the heating operation or cooling operation by the heating unit 3 or the cooling unit 5.

For example, an internal air sensor as an internal air temperature detecting means for detecting the air temperature in the vehicle interior R, and an external air sensor as an external air temperature detecting means for detecting the vehicle exterior temperature (outside air temperature) are connected to the input side of the control device, and the detection signals from these sensors are inputted into the input side of the control device. Furthermore, the operating switch that actuates the humidifier 1 and so forth are connected to the input side of the control device, and the operation signals from these switches are inputted into the input side of the control device.

This control device may be configured integrally with, for example, a control device for air-conditioning that controls the operations of the components of the air conditioner for a vehicle. This control device may mutually communicate the information regarding the control state of a device as its controlled object separately from the control device for air-conditioning.

The operation of the humidifier 1 having the above configuration will be described below. The humidifier 1 is activated, for example, when the operating switch is turned on by the occupant's operation with the temperature of the vehicle interior regulated by the air conditioner for a vehicle.

For example, the humidifier 1 is activated when the outside air temperature is relatively low and the vehicle interior R becomes dry easily as in winter periods. Thus, in the following description of the operation, an explanation will be given on the premise of the state where the outside air temperature is 5° C., the air temperature of the vehicle interior R is regulated at 25° C., and the relative humidity of the vehicle interior R is approximately 20% RH at the time of activation of the humidifier 1.

When the operating switch is turned on, the humidifier 1 switches alternately between the state where the control device rotates the electric motor of the blower 2 forward, and the state where the control device rotates the electric motor reversely, for example, at every predetermined time. Consequently, the humidifier 1 switches at every predetermined time between a ventilation path along which the blown air flows as indicated by the arrowed continuous line in FIG. 2, and a ventilation path along which the blown air flows as indicated by the arrowed short dashes line in FIG. 2.

Figure 3:
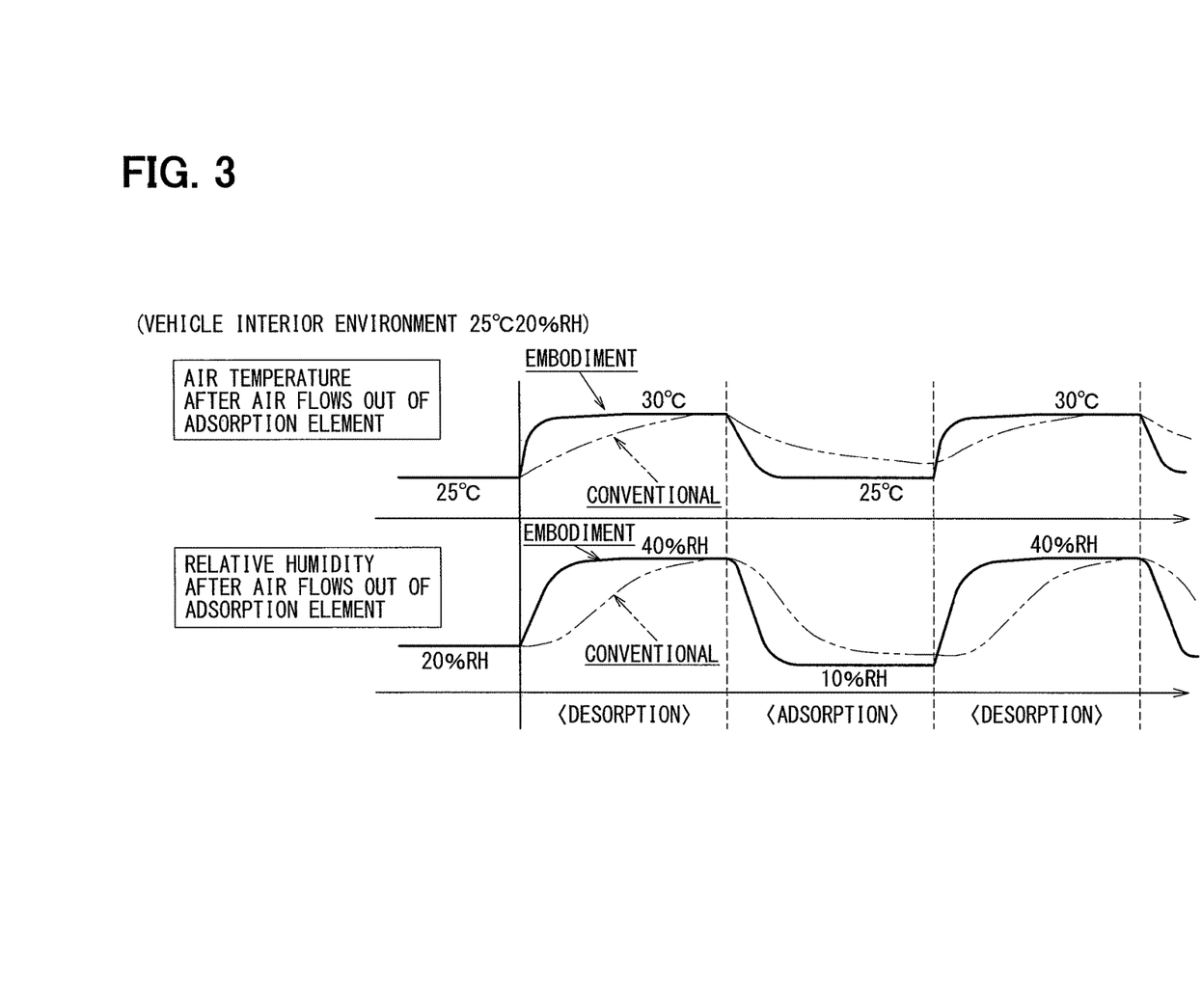
FIG. 3 is a graph illustrating air temperature change and relative humidity change after air flows out of an adsorption element for the device of the first embodiment and a previously proposed device.

Firstly, the state where the control device rotates the electric motor of the blower 2 forward will be described with reference to the operation explanatory diagram in FIG. 3. The air temperature and the relative humidity illustrated in FIG. 3 are values after flowing out of the adsorbing material module 4, and are values before cooling by the cooling unit 5. When the control device rotates the electric motor of the blower 2 forward, the air of the vehicle interior R, whose temperature is regulated at 25° C., is drawn into the air passage 62 in the casing 6 of the humidifier 1 through the first opening 60. The blown air drawn into the air passage 62 is first heated when passing through the heating unit 3.

In this case, the control device operates the heating unit 3 with a constant output, or controls the output of the heating unit 3 according to air temperature change, such that the temperature of blown air after passing through the heating unit 3 is higher than the air temperature of the vehicle interior R by a predetermined temperature (e.g., 5° C.). Thus, the temperature of blown air after passing through the heating unit 3 rises to approximately 30° C.

The blown air after passing through the heating unit 3 flows into the adsorbing material module 4. In this case, the relative humidity of the blown air with increased temperature after passing through the heating unit 3 is lower than the relative humidity of the air of the vehicle interior R. Thus, bringing the blown air with low relative humidity after passing through the heating unit 3 into contact with the adsorbing material of the adsorbing material module 4 creates conditions where the water adsorbed to the adsorbing material is desorbed easily to the air. Specifically, the air whose relative humidity is lowered by the heating unit 3 easily contains the water retained by the adsorbing material, and the air after flowing out of the adsorbing material module 4 becomes humidified air, which is humidified sufficiently.

This humidified air is further cooled by the cooling unit 5, and thus the temperature of humidified air whose temperature is increased by the heating unit 3 reduces. Consequently, the humidified air can be provided toward the occupant from the second opening 61 in a cool-air state. Thus, in the humidifier 1, the humidified wind that improves the occupant's comfort can be provided by making the air, which has been humidified sufficiently through the heating by the heating unit 3, the cool air by the cooling unit 5 at the time of desorption.

At the time of this desorption, the air before being supplied to the adsorbing material module 4 is heated by the heating unit 3. Thus, the temperature of this air can rise quickly. Moreover, the relative humidity of air can be lowered promptly by the quick air temperature rise. Consequently, the water desorption at the adsorbing material module 4 can be activated to promptly make high the relative humidity of the air after flowing out of the adsorbing material module 4. In contrast, the above-described conventional art adopts the method whereby to heat the adsorbing material module, so that the temperature of the adsorbing material module gradually rises. Thus, the water desorption at the adsorbing material module is not activated, and thus the relative humidity of the air after flowing out of the adsorbing material module increases only gradually (thus far, see FIG. 3).

Next, the state where the control device rotates the electric motor of the blower 2 reversely will be described with reference to the operation explanatory diagram in FIG. 3. When the control device rotates the electric motor of the blower 2 reversely, the air of the vehicle interior R, whose temperature is regulated at 25° C., is drawn into the air passage 62 in the casing 6 of the humidifier 1 through the second opening 61. The blown air drawn into the air passage 62 is first cooled when passing through the cooling unit 5.

The blown air after passing through the cooling unit 5 flows into the adsorbing material module 4. In this case, the relative humidity of the blown air with decreased temperature after passing through the cooling unit 5 is higher than the relative humidity of the air of the vehicle interior R. Consequently, the blown air with higher relative humidity than the air of the vehicle interior R can be brought into contact with the adsorbing material, creating conditions where the water in air is easily adsorbed to the adsorbing material. Thus, the air whose relative humidity is increased by the cooling unit 5 has its water easily adsorbed by the adsorbing material. The air after flowing out of the adsorbing material module 4 becomes dehumidified air, which is dehumidified sufficiently.

The blown air which has flowed out of the adsorbing material module 4 is heated when passing through the heating unit 3 to be blown out through the first opening 60 to the rear-seat side or the lower side of the vehicle interior, which is not directed to the upper body of the occupant.

At the time of this adsorption, the air before being supplied to the adsorbing material module 4 is cooled by the cooling unit 5. Thus, the temperature of this air can reduce quickly. Moreover, the relative humidity of air can be made high promptly by the quick air temperature reduction. Consequently, the water adsorption at the adsorbing material module 4 can be activated to promptly make low the relative humidity of the air after flowing out of the adsorbing material module 4. In contrast, the above-described conventional art adopts the method whereby the heater is stopped to stop heating the adsorbing material module at the time of adsorption, so that the temperature of the adsorbing material module consequently decreases only gradually. Thus, active adsorption is not performed in the adsorbing material module. Therefore, the relative humidity of the air after flowing out of the adsorbing material module decreases only gradually (thus far, see FIG. 3).

The operation and effects of the humidifier 1 of the first embodiment will be described below. The humidifier 1 supplies the humidified air, which is humidified by the water desorbed from the adsorbing material into the humidification object space (vehicle interior R). The humidifier 1 includes the heating part that heats the air, which is supplied to the adsorbing material, the adsorbing material module 4 that includes the adsorbing material and that desorbs the water, which is adsorbed in the adsorbing material, to the air heated by the heating part, and the cooling part that cools the air humidified by the adsorbing material module 4. At the time of desorption to desorb water from the adsorbing material, after water is desorbed from the adsorbing material to the air heated by the heating part, this air is cooled by the cooling part and then the air is supplied as humidified air into the humidification space. At the time of adsorption to adsorb the water of air into the adsorbing material, the water is adsorbed by the adsorbing material after cooling the air by the cooling part.

As a result of this configuration, the air before being supplied to the adsorbing material module 4 is heated by the heating part at the time of desorption, so that the temperature of this air can rise quickly. Moreover, the quick air temperature rise can rapidly reduce the relative humidity of the air. Consequently, the water desorption at the adsorbing material module 4 is activated, and the relative humidity of air after flowing out of the adsorbing material module 4 can be made high quickly.

On the other hand, at the time of adsorption, the air before being supplied to the adsorbing material module 4 is cooled by the cooling part, so that the temperature of this air can be reduced quickly. Moreover, the quick air temperature reduction can rapidly increase the relative humidity of the air. Consequently, the water adsorption at the adsorbing material module 4 can be activated to promptly make low the relative humidity of the air after flowing out of the adsorbing material module 4. As described above, there can be provided the humidifier 1 that can remarkably improve the temperature responsiveness and humidity responsiveness of the air after flowing out of the adsorbing material module 4 as compared with the above-described conventional art both at the time of desorption and at the time of adsorption. This humidifier 1 can realize effective humidification and dehumidification without impairing the comfort of a person in the room.

Using a simple configuration, the humidifier 1 can provide the device that is capable of achieving both the quick increase in temperature and humidity of the air after flowing out of the adsorbing material module 4 at the time of desorption and the quick reduction in temperature and humidity of the air after flowing out of the adsorbing material module 4 at the time of adsorption.

The heating part, the adsorbing material module 4, and the cooling part are provided in the air passage 62 through which air flows respectively at the time of adsorption and at the time of desorption. In the air passage 62, the air-blowing part generates the air flow directions which are opposite from each other at the time of desorption and at the time of adsorption. The heating part, the adsorbing material module 4, and the cooling part are provided in the air passage 62 side by side in the order of the heating part, the adsorbing material module 4, and the cooling part in the direction in which air flows at the time of desorption. This configuration can provide the humidifier 1 that can easily switch between the desorption and adsorption by changing the air-blowing direction by the air-blowing part. Furthermore, there is no need to provide a ventilation path switching means for switching the ventilation path. Thus, the entire humidifier 1 can be further downsized and the production cost of the entire humidifier 1 can be further reduced.

The humidification object space is the vehicle interior R. At the time of adsorption, the heating part heats the air whose water has been adsorbed by the adsorbing material, and this heated air is supplied to the vehicle interior without being blown to the upper body of the occupant seated in the vehicle interior. For example, the first opening 60 through which the air at the time of adsorption is blown out toward the vehicle interior can be directed toward the rear seat in the vehicle interior, or the opening direction of the first opening 60 can be directed such that the blown air flows along the interior member 12 on the ceiling. In addition, the blown air cannot easily blow against the occupant by directing the first opening 60 toward the lower part of the vehicle interior such as the vicinity of a floor surface. As a result of this configuration, heating is carried out by the heating part at the time of adsorption as well as at the time of desorption, and thus, for example, the heating unit 3 can constantly be in operation. This eliminates the need to control the timing for heating by the heating unit 3 or for cooling by the cooling unit 5, so that a circuit for control or a control device for switching the operation timing does not need to be included and the cost of the humidifier 1 can be reduced.

The cooling unit 5 is a heat exchanger that cools the air by heat exchange between the air flowing through the air passage 62 and the outside air. Consequently, the outside air having low temperature in winter periods can be used as a medium for cooling. Therefore, the power for cooling is unnecessary and an energy-saving and low-cost cooling unit can be configured.

(Second Embodiment)

Figure 4:
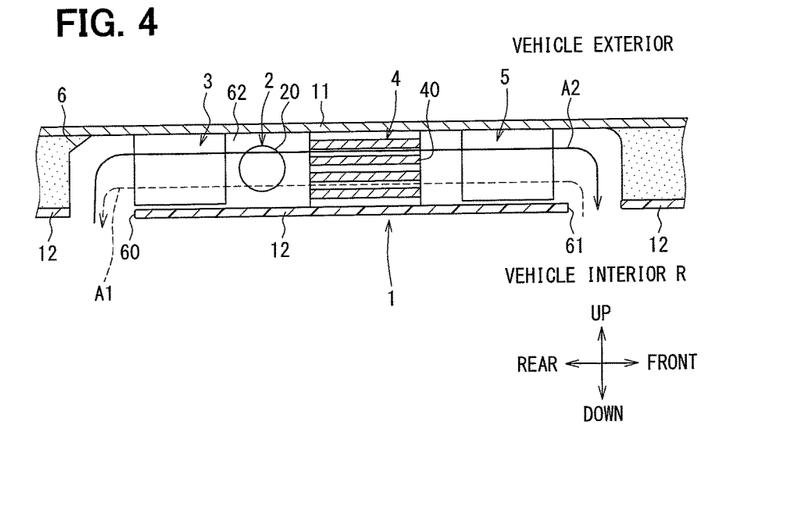
FIG. 4 is a sectional view illustrating a general configuration of a humidifier in accordance with a second embodiment.

A second embodiment will be described with reference to FIG. 4. In the second embodiment, the component part having the same reference numeral as in the drawing of the first embodiment, and the configuration which is not explained are similar to the first embodiment, and have similar operation and effects. The second embodiment explains only the part that is different from the first embodiment.

A humidifier 1 of the second embodiment is different in position of a blower 2 from the first embodiment. In the humidifier 1 of the second embodiment, a heating unit 3, the blower 2, an adsorbing material module 4, and a cooling unit 5 are arranged side by side in this order in an air passage 62 from a first opening 60-side in a direction A2 in which air flows at the time of desorption. Thus, the blower 2 is located between the heating unit 3 and the adsorbing material module 4.

(Third Embodiment)

Figure 5:
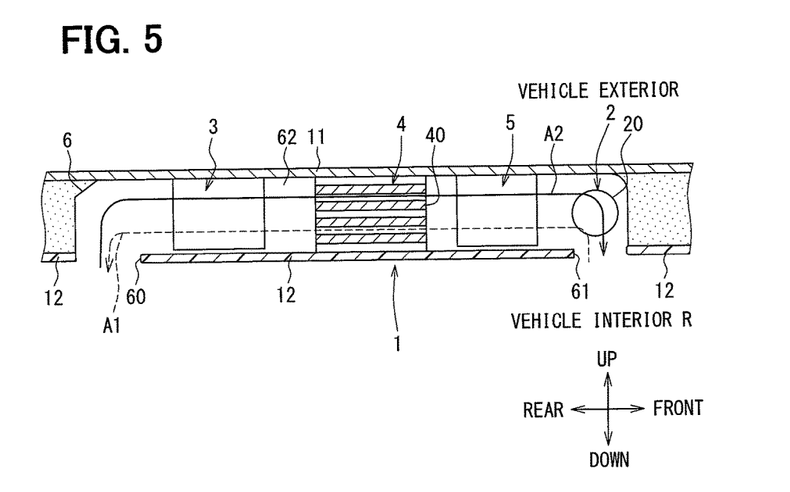
FIG. 5 is a sectional view illustrating a general configuration of a humidifier in accordance with a third embodiment.

A third embodiment will be described with reference to FIG. 5. In the third embodiment, the component part having the same reference numeral as in the drawing of the first embodiment, and the configuration which is not explained are similar to the first embodiment, and have similar operation and effects. The third embodiment explains only the part that is different from the first embodiment.

A humidifier 1 of the third embodiment is different in position of a blower 2 from the first embodiment. In the humidifier 1 of the third embodiment, a heating unit 3, an adsorbing material module 4, a cooling unit 5, and the blower 2 are arranged side by side in this order in an air passage 62 from a first opening 60-side in a direction A2 in which air flows at the time of desorption. Thus, among these devices, the blower 2 is located closest to a second opening 61.

(Fourth Embodiment)

A fourth embodiment will be described with reference to FIGS. 6 to 11. The fourth embodiment explains a blower 102 that can change its wind direction reversely by the function of a guide without changing the rotation direction of a fan.

Figure 6:
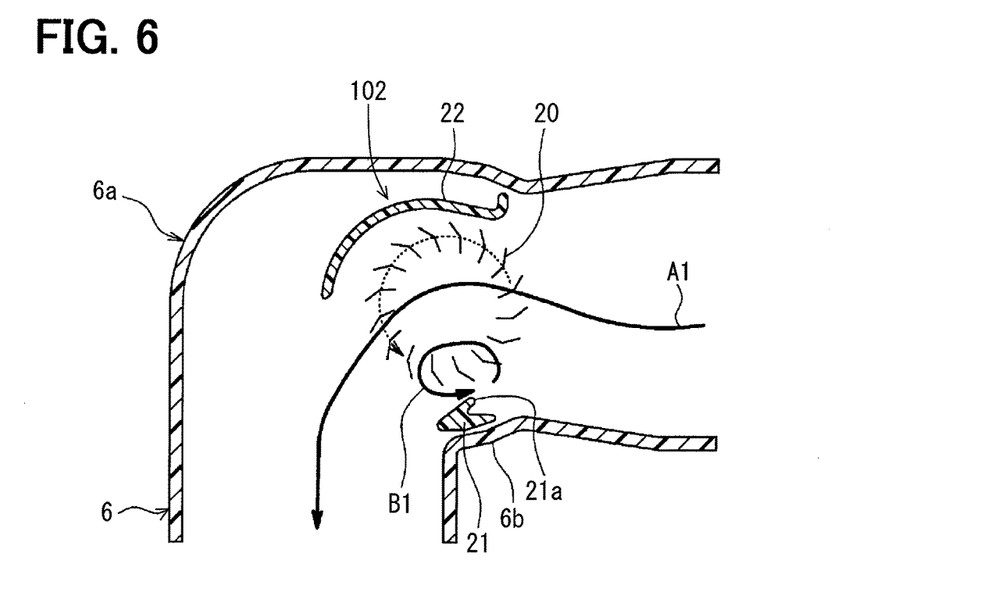
FIG. 6 is a sectional view illustrating configurations of a blower and a wind-direction changing device and operation of each part at time of adsorption in accordance with a fourth embodiment.
Figure 7:
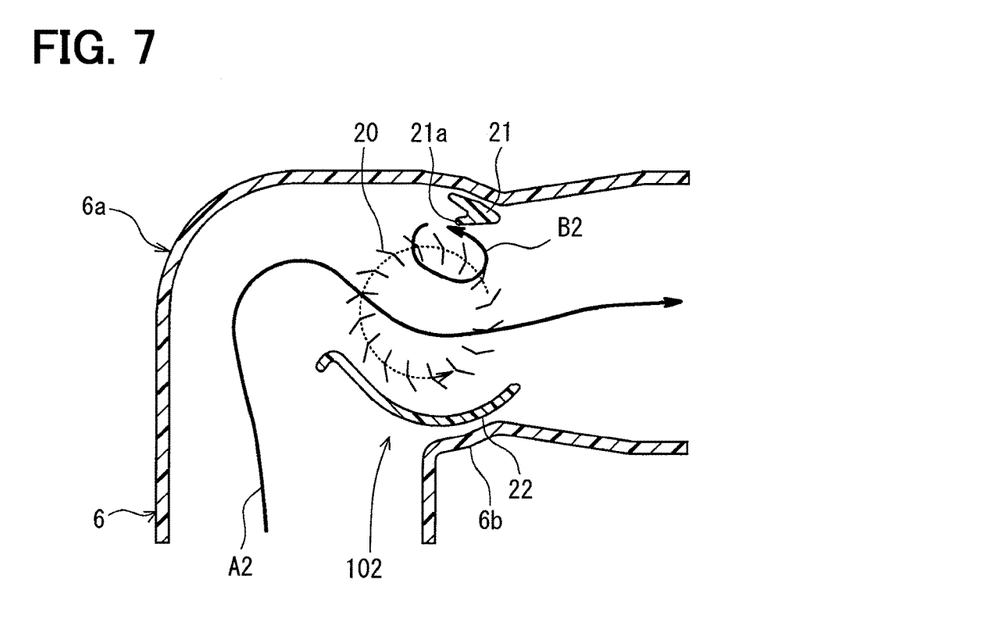
FIG. 7 is a sectional view illustrating the configurations of the blower and the wind-direction changing device and operation of each part at time of desorption according to the fourth embodiment.

The blower 102 of the fourth embodiment includes a casing 6, a fan 20, a first guide part 21, and a second guide part 22. The blower 102 has an air-blowing function, and a wind-direction changing function that can change the wind direction reversely by the function of the guide. Thus, the blower 102 includes a wind-direction changing device. The casing 6, the fan 20, the first guide part 21, and the second guide part 22 are made of synthetic resin.

The casing 6 defines an air passage, and accommodates therein the fan 20, the first guide part 21, and the second guide part 22. The casing 6 has a bent part 6a to accommodate the fan 20 near an inner peripheral wall 6b of the bent part 6a.

Figure 8:
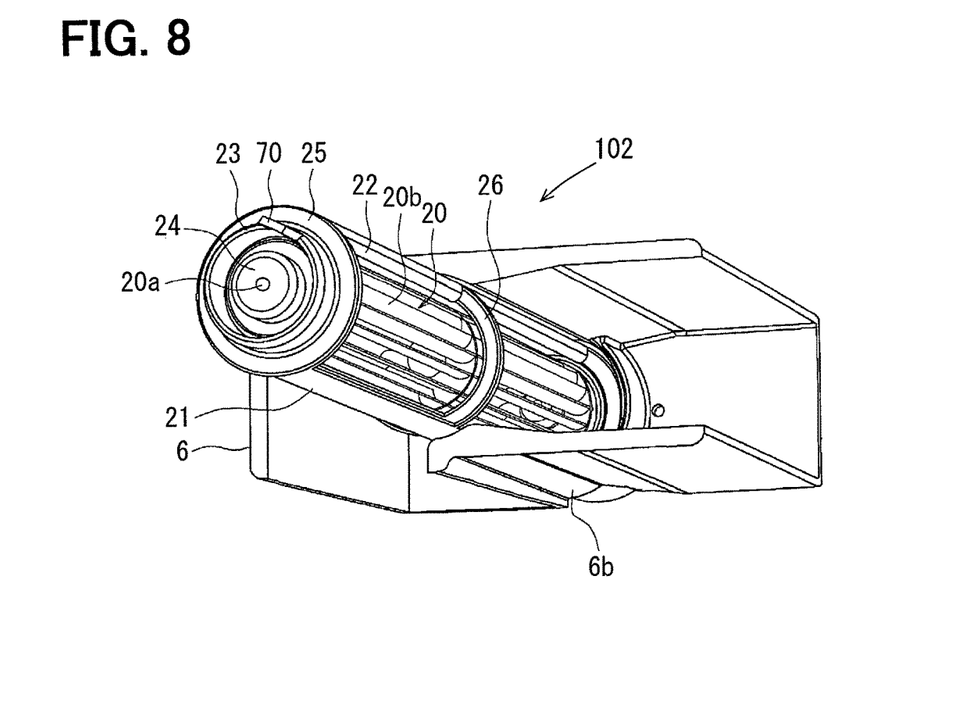
FIG. 8 is a perspective view relating to an either half of a casing, the blower, a first guide part, and a second guide part in FIG. 6.

The fan 20 is of a flow-through type, i.e., a cross-flow type. As illustrated in FIG. 8, the fan 20 is configured by an impeller that rotates around a fan rotation shaft 20a. The impeller includes many blades 20b arranged around the rotation axis. By the rotation of the impeller, air flows into the impeller to flow through the inside of the impeller, and flows out of the impeller. The fan 20 has a shape with longer width in the direction of the fan rotation shaft 20a and with shorter width in its radial direction. The fan 20 is rotated by an electric motor provided at the casing 6.

The first guide part 21 and the second guide part 22 are arranged around the fan 20. In the following explanation, the description common to each of the first guide part 21 and the second guide part 22 may be expressed as each guide part 21, 22. Each guide part 21, 22 is for flowing air into the impeller to flow through the inside of the impeller and for flowing air out of the impeller by the rotation of the impeller. In other words, each guide part 21, 22 is a guide part that is necessary to set the air-blowing direction of the fan 20.

The first guide part 21 is a part that is generally called a stabilizer, and is for stably forming a circulating flow B1 and a circulating flow B2 inside the fan 20 as illustrated in FIGS. 6 and 7. The first guide part 21 is adjacent to the fan 20. In this example, the first guide part 21 has a V-shape in cross-section, and its end portion 21a is close to the fan 20.

The second guide part 22 is for smoothly sending out the air flowing out of the fan 20. The second guide part 22 has a shape curved along the outer periphery of the fan 20, and mostly has a shape with an even width in the radial direction of the fan 20. To send out the air from the fan 20 without being wasted, the second guide part 22 is provided such that its distance from the fan 20 gradually becomes larger in the rotation direction of the fan 20. The second guide part 22 is disposed on an opposite side of the fan 20 from the first guide part 21. The second guide part 22 may mostly be located on the opposite side from the first guide part 21.

Each guide part 21, 22 is configured to be rotatable, and rotates and moves between its stop position in FIG. 6 and its stop position in FIG. 7. As illustrated in FIG. 8, the first guide part 21 and the second guide part 22 have an integral structure connected by a disk-shaped first connecting part 25 that is located at the end in the direction of the rotation axis, and a ring-shaped second connecting part 26 that is located at the center in the direction of the rotation axis.

Figure 9:
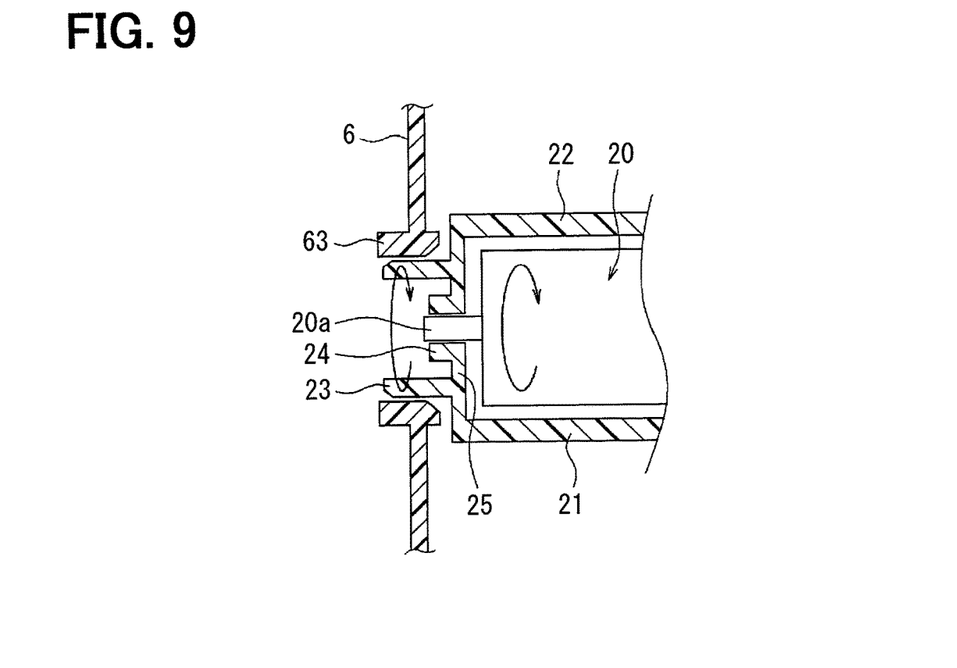
FIG. 9 is a sectional view illustrating the blower the view parallel to a fan rotation axis according to the fourth embodiment.

As illustrated in FIGS. 8 and 9, a fan bearing part 24 that supports the fan rotation shaft 20a is provided at the first connecting part 25. The fan bearing part 24 has an opening and the fan rotation shaft 20a is inserted in this opening. A cylindrical guide rotation shaft 23 that is disposed coaxially with the fan rotation shaft 20a is provided at the first connecting part 25. A guide bearing part 63 that supports the guide rotation shaft 23 is provided at the casing 6. The guide bearing part 63 has an opening and the guide rotation shaft 23 is inserted in this opening.

In this manner, the guide rotation shaft 23 is supported rotatably by the guide bearing part 63 of the casing 6, so that each guide part 21, 22 can rotate. Moreover, the fan rotation shaft 20a is supported rotatably by the fan bearing part 24, so that the rotation torque generated at the time of rotation of the fan 20 is transmitted to each guide part 21, 22.

Figure 10:
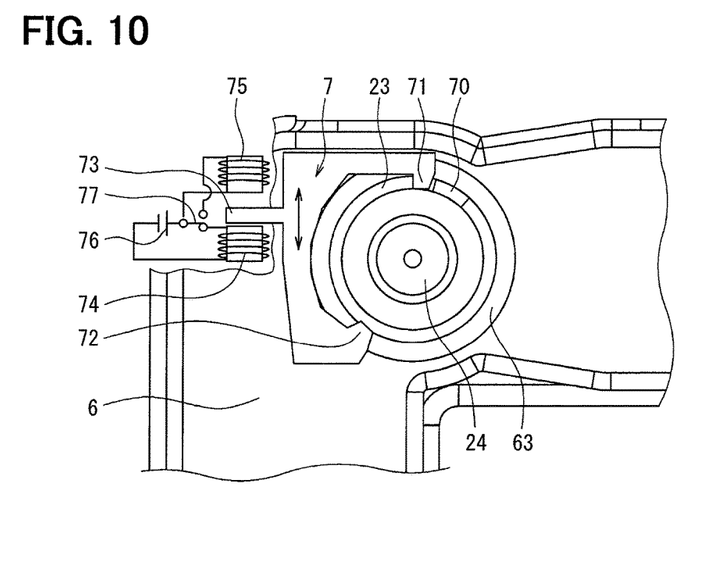
FIG. 10 is an enlarged view illustrating the operation of the blower at the time of adsorption according to the fourth embodiment.
Figure 11:
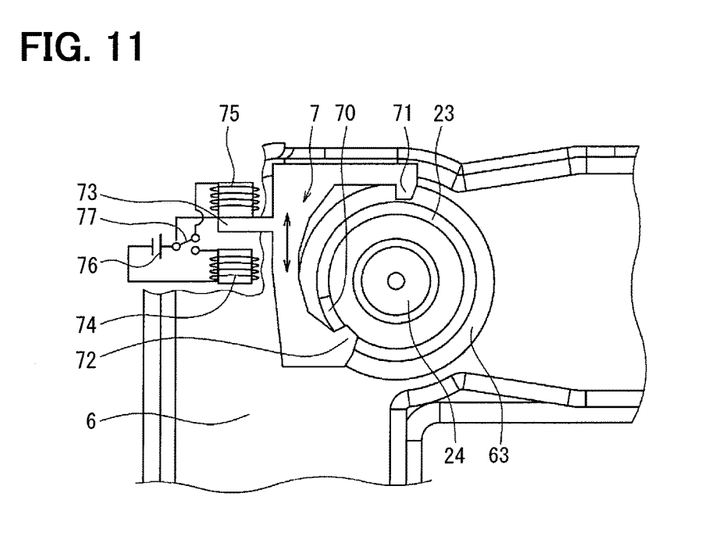
FIG. 11 is an enlarged view illustrating the operation of the blower at the time of desorption according to the fourth embodiment.

As illustrated in FIGS. 10 and 11, a stopper pin 70 is provided for the guide rotation shaft 23, and a stopper 7 is provided for the casing 6. The stopper pin 70 and the stopper 7 serve as a mechanism for stopping the rotation of each guide part 21, 22 and for switching the stop position of each guide part 21, 22.

As illustrated in FIG. 8, the stopper pin 70 is a projecting part obtained by a part of the cylindrical guide rotation shaft 23 projecting in the axial direction. The stopper 7 includes a first contact part 71 and a second contact part 72 that are brought into contact with the stopper pin 70 to stop the rotation of each guide part 21, 22. The stopper 7 has a C-shape, and the two end parts of the C-shape are configured as the first contact part 71 and the second contact part 72.

The stopper 7 can move in the up and down directions in FIGS. 10 and 11. For example, the stopper 7 made of metal is used, and two electromagnets 74, 75, a power source 76, and a switch 77 that switches the connection between one of the two electromagnets 74, 75 and the power source 76 are used as the drive source of the stopper 7. The connection between one of the two electromagnets 74, 75 and the power source 76 is switched by the switch 77. Consequently, a part 73 of the stopper 7 is attracted to the electromagnet 74 on a lower side in FIG. 10, or is attracted to the electromagnet 75 on an upper side in FIG. 11.

When the stopper 7 is located at a lower position as illustrated in FIG. 10, the first contact part 71 is in contact with the stopper pin 70, and each guide part 21, 22 is thus located at the stop position in FIG. 6. In contrast, when the stopper 7 is located at an upper position as illustrated in FIG. 11, the second contact part 72 is in contact with the stopper pin 70, and each guide part 21, 22 is thus located at the stop position in FIG. 7. In this manner, the stop position of each guide part 21, 22 can be switched to one of the stop positions in FIGS. 6 and 7.

The operation of the blower 102 configured above will be described below. When the air-blowing direction of the fan 20 is a lower-left direction, i.e., an air-blowing direction at the time of adsorption as indicated by a direction A1 of an arrow in FIG. 6, the stop position of each guide part 21, 22 is set at the stop position in FIG. 6. This is realized by rotating the fan 20 with the stopper 7 located at the lower position in FIG. 10. Specifically, if the stopper pin 70 is not located at the position in FIG. 10 where the stopper pin 70 is in contact with the first contact part 71, each guide part 21, 22 rotates by the rotation torque of the fan 20. Then, the rotation of each guide part 21, 22 stops when the stopper pin 70 comes into contact with the first contact part 71. Consequently, each guide part 21, 22 is located at the stop position in FIG. 6. As a result of this, air flows in from the right side of the fan 20, and air is sent out to the lower-left side of the fan 20. Thus, the air in the room drawn from a second opening 61 forms a flow of blown air blown out through a first opening 60 to the room interior at the time of adsorption.

In contrast, when the air-blowing direction of the fan 20 is a right direction as indicated by a direction A2 of an arrow in FIG. 7, the stop position of each guide part 21, 22 is set at the stop position in FIG. 7. This is realized by rotating the fan 20 with the stopper 7 located at the upper position in FIG. 11. Specifically, if the stopper pin 70 is not located at the position in FIG. 11 where the stopper pin 70 is in contact with the second contact part 72, each guide part 21, 22 rotates by the rotation torque of the fan 20. Then, the rotation of each guide part 21, 22 stops when the stopper pin 70 comes into contact with the second contact part 72. Consequently, each guide part 21, 22 is located at the stop position in FIG. 7. As a result of this, air flows in from the lower-left side of the fan 20, and air is sent out to the right side of the fan 20. Thus, the air in the room drawn from the first opening 60 forms a flow of blown air blown out through the second opening 61 to the room interior at the time of desorption.

The blower 102 of the fourth embodiment employs the first guide part 21 and the second guide part 22 that can rotate around the fan 20 as a guide part that is necessary to switch the air-blowing direction. The pair of the first guide part 21 and the second guide part 22 are provided away from the wall of the casing 6 that defines the air passage. Thus, a guide part that is continuous with the first guide part 21 and the second guide part 22 such as a fixed rear guide does not need to be disposed at the casing 6. This is because the air-blowing direction of the fan 20 can be set without providing the guide part that is continuous with the first guide part 21 and the second guide part 22.

As a guide that changes the air-blowing direction of the fan in two directions: forward and backward, one of the conventional arts includes a pair of stabilizers arranged symmetrically with respect to the fan, a pair of fixed rear guides arranged across the openings from the stabilizers, and a rotation rear guide corresponding to these openings. This conventional art can change the air-blowing direction by rotating the rotation rear guide to one of the pair of fixed rear guides to put the one fixed rear guide and the rotation rear guide in a continuous state and to form the opening at the other fixed rear guide.

In the fourth embodiment, the pair of guide parts 21, 22 are arranged at the casing 6. In this manner, there is no need to provide the same number of stabilizers and fixed rear guides as the air-blowing direction of the fan as in the conventional art. Thus, the casing 6 can be reduced in size compared to the conventional art. In particular, the effect of downsizing of the casing 6 due to the elimination of the need to provide the two fixed rear guides at the casing 6 is significant.

Each guide part 21, 22 is disposed coaxially with the fan 20 and is configured to be rotatable with the position of the fan rotation shaft 20a as the rotation center. Each guide part 21, 22 is disposed around the fan 20 so that the distance from the rotation center of the fan 20 to the outermost peripheral portion of each guide part 21, 22 in the radial direction of the fan 20 is equal to or smaller than twice the radius of the fan 20. The casing 6 can be reduced in size by designing the shape and arrangement of each guide part 21, 22 such that the distance from the rotation center of the fan 20 to the outermost peripheral portion of each guide part 21, 22 is short as described above.

According to the conventional art, the two stabilizers adjacent to the fan are arranged to be continuous with the rotation rear guide, and are thus at the positions to interfere with the rotational movement of the rotation rear guide. Thus, there has been required a mechanism for avoiding this, such as a mechanism for rotationally moving the stabilizer. In contrast, each guide part 21, 22 of the fourth embodiment is disposed away from the wall of the casing 6 that defines the air passage, and a member that interferes with the rotational movement of each guide part 21, 22 does not exist, eliminating the need to provide the mechanism for avoiding this.

As a procedure for switching the air-blowing direction of the fan, the conventional art has required the process for rotationally moving the stabilizer, the process for rotationally moving the rotation rear guide, and the process for returning the stabilizer to its original position.

In contrast, the fourth embodiment can switch the air-blowing direction of the fan 20 even though the rotation direction of the fan 20 remains a constant direction by carrying out the operation to rotationally move each guide part 21, 22. The operation to move another member that interferes with the rotational movement of each guide part 21, 22 before or after the rotational movement of each guide part 21, 22 is unnecessary. Thus, switching of the air-blowing direction can be performed more easily than the conventional art.

In the fourth embodiment, the fan bearing part 24 is provided at the first connecting part 25 of each guide part 21, 22, and the guide bearing part 63 is provided at the casing 6. Thus, the rotation torque generated at the time of rotation of the fan 20 is transmitted to each guide part 21, 22 to rotate the first guide part 21 and the second guide part 22.

At the time of air-blowing by the fan 20, the fourth embodiment stops the rotation of each guide part 21, 22 by bringing the stopper pin 70 into contact with the stopper 7. At the time of switching of the air-blowing direction of the fan 20, the position of the stopper 7 is switched between the upper position and the lower position to make switchable the stop position of each guide part 21, 22.

As a consequence of these, the fourth embodiment renders unnecessary a driving device exclusively for rotating each guide part 21, 22 to switch the position of each guide part 21, 22. The fourth embodiment requires a drive source for the stopper 7, but this has required driving force smaller than the driving device exclusively for rotating each guide part 21, 22, reducing its size. Therefore, the fourth embodiment can reduce the entire blower in size as compared with using the dedicated driving device.

(Fifth Embodiment)

A fifth embodiment will be described with reference to FIGS. 12 and 13. In the fifth embodiment, the component part having the same reference numeral as in the drawings of the first embodiment and the fourth embodiment, and the configuration which is not explained are similar to the previously-described embodiments, and have similar operation and effects. The fifth embodiment explains only the part that is different from the first embodiment and the fourth embodiment.

A blower 102 in a humidifier 1 of the fifth embodiment is different from the first embodiment. The blower 102 has a wind-direction changing function that can change the wind direction reversely by the function of a guide. The blower 102 includes a casing, a fan 20, a first guide part 21, and a second guide part 22 as described in the fourth embodiment.

Figure 12:
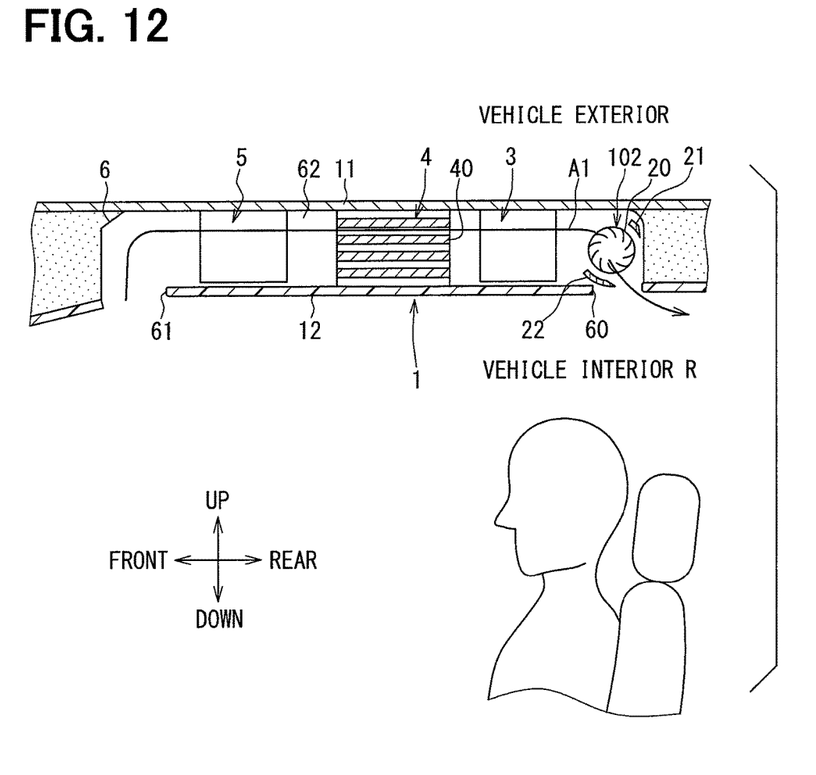
FIG. 12 is a sectional view illustrating a state of a humidifier at time of adsorption in accordance with a fifth embodiment.

When each guide part 21, 22 is set at a stop position in FIG. 12, a stopper pin 70 is in contact with a first contact part 71 to stop the rotation of each guide part 21, 22. The rotation of the fan 20 in this state forms a flow of blown air (direction A1) at the time of adsorption when the air in the vehicle interior flows into an air passage 62 through a second opening 61 and is blown out to the vehicle interior through a first opening 60. In this case, at least a part of the second guide part 22 having an inner surface curved along the outer periphery of the fan 20 is located in the first opening 60 as illustrated in FIG. 12. Thus, the air is blown out to the vehicle interior in a direction along the inner surface of the second guide part 22. Consequently, at the time of adsorption, the air flows along the ceiling of the vehicle interior, and thus the dry air can be restricted from being blown out toward the occupant.

Figure 13:
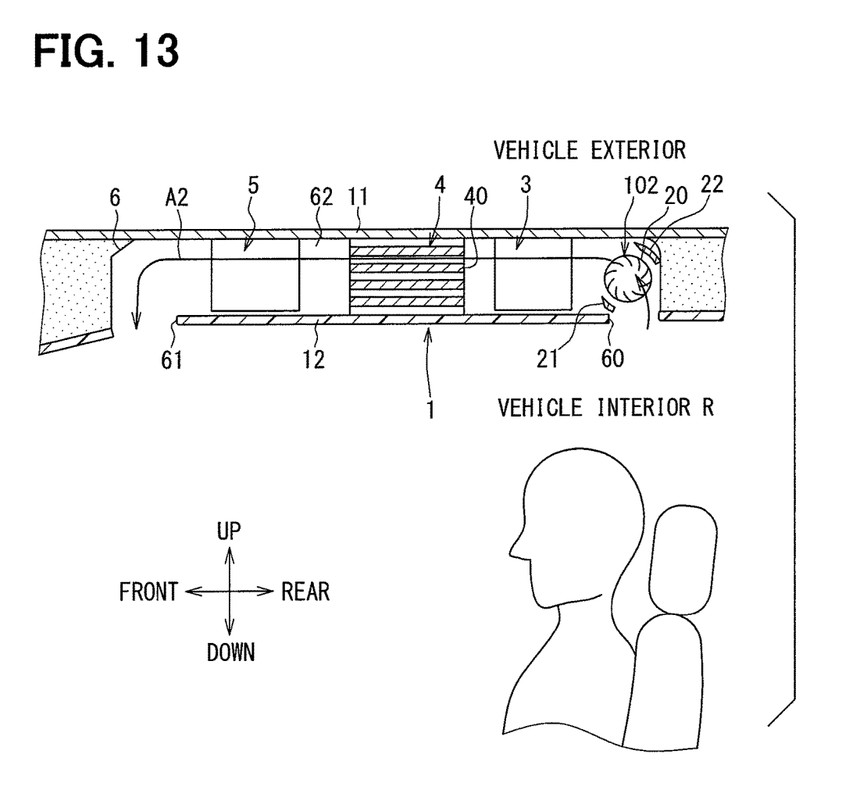
FIG. 13 is a sectional view illustrating a state of the humidifier at time of desorption according to the fifth embodiment.

When each guide part 21, 22 is set at a stop position in FIG. 13, the stopper pin 70 is in contact with a second contact part 72 to stop the rotation of each guide part 21, 22. The rotation of the fan 20 in this state forms a flow of blown air (direction A2) at the time of desorption when the air in the vehicle interior flows into the air passage 62 through the first opening 60 and is blown out to the vehicle interior through the second opening 61.

The humidifier 1 of the fifth embodiment includes the flow-through type fan near the blow-out port at the time of adsorption, and thus has a characteristic of a suction angle and a blow-out angle being different. Also, the air-blowing that does not blow the dry air to the occupant can be provided by the function of the first guide part 21 and the second guide part 22. Thus, the humidifier 1 of the fifth embodiment can provide an advantageous structure for a device that humidifies the vehicle interior.

The embodiments of the present disclosure have been described above. However, the present disclosure is not by any means limited to the above embodiments, and can be practiced in various modifications. The structures of the above embodiments are only illustrations, and the technical scope of the present disclosure is not limited to the range of these descriptions. Modifications to the above embodiments will be described below.

In the above embodiments, the blower 2, the heating unit 3, the adsorbing material module 4, the cooling unit 5, and so forth are arranged at intervals. However, the humidifier 1 may be configured to include a device having more than one function that integrates at least two devices of the blower 2, the heating unit 3, the adsorbing material module 4, and the cooling unit 5. In this case as well, in the humidifier 1, the heating unit 3, the adsorbing material module 4, and the cooling unit 5 are arranged in this order in the direction in which air flows at the time of desorption.

The above embodiments have illustrated the example in which a module configured by stacking and arranging the metal plate-shaped members 40 supporting the adsorbing materials at intervals is employed for the adsorbing material module 4. However, the adsorbing material module 4 is not limited to this example. For example, the adsorbing material are supported by a corrugated plate bent in a corrugated shape, and a module configured by stacking and arranging these corrugated plates at intervals may be used. Alternatively, a module obtained by supporting the adsorbing material by a honeycomb member including a passage which is formed in a hexagonal shape in cross-section may be used.

The above first embodiment has illustrated the configuration for switching the ventilation path by the control device rotating the electric motor of the blower 2 forward or backward, but switching of the ventilation path is not limited to this example.

The humidifier 1 of the above embodiments is disposed on the back side of the ceiling material of the vehicle, but the installation place of the humidifier 1 is not limited to this installation place. For example, the humidifier 1 can be disposed on the back side of the interior member communicating with an instrument panel, a door trim, a steering column, and a trunk room.

The above embodiments have illustrated the example in which the air of the vehicle interior R is employed as the air introduced into the humidifier 1 at the time of adsorption, but the air of the vehicle exterior such as outside air may be introduced.

In the above embodiments, the second opening 61 is located on the front-seat side so that the humidified air is supplied toward the vehicle front seat, and the first opening 60 is located on the rear-seat side so that the dehumidified air is supplied toward the vehicle rear seat. However, the positional relationship between the second opening 61 and the first opening 60 is not limited to this positional relationship.

In the above embodiments, the second opening 61 is disposed to open toward the upper body of the occupant seated on the front seat of the vehicle, and the first opening 60 is disposed to open toward the rear seat. However, the arrangement of the openings 60, 61 is not limited to this example.

The above first embodiment illustrates the example in which the dehumidified blown air flowing out of the adsorbing material module 4 at the time of adsorption is heated by the heating unit 3, which is a heating part. However, the blown air flowing out of the adsorbing material module 4 at the time of adsorption may be blown out to the humidification object space without being heated by the heating part.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. A humidifier for supplying humidified air, which is humidified by water desorbed from an adsorbing material, to a humidification object space, the humidifier comprising:
   a heating part that heats air, which is supplied to the adsorbing material;
   an adsorbing material module that includes the adsorbing material and that desorbs water, which is adsorbed in the adsorbing material, to air heated by the heating part; and
   a cooling part that cools air humidified by the adsorbing material module, wherein:
   at time of desorption to desorb water from the adsorbing material, the adsorbing material module desorbs water from the adsorbing material to air heated by the heating part, and then the cooling part cools the air to be supplied to the humidification object space as the humidified air; and
   at time of adsorption to adsorb water of air into the adsorbing material, the cooling part cools air, and then water is adsorbed into the adsorbing material.

2. The humidifier according to claim 1, wherein the heating part, the adsorbing material module, and the cooling part are provided in an air passage through which air flows respectively at the time of desorption and at the time of adsorption, the humidifier further comprising an air-blowing part that generates flow directions of air opposite from each other in the air passage at the time of desorption and at the time of adsorption, wherein the heating part, the adsorbing material module, and the cooling part are provided in the air passage side by side in order of the heating part, the adsorbing material module, and the cooling part in a direction in which air flows at the time of desorption.

3. The humidifier according to claim 1, wherein:
   the humidification object space is a vehicle interior; and
   at the time of adsorption, the heating part heats air whose water has been adsorbed into the adsorbing material, and the heated air is supplied to the vehicle interior without being blown to an upper body of a vehicle occupant seated in the vehicle interior.

4. The humidifier according to claim 2, wherein:
the air-blowing part includes:
- a flow-through type fan that is disposed in a casing of the humidifier and that rotates with its fan rotation shaft as a rotation center;
- a first guide part that is disposed around the fan in the casing to form a circulating flow in the fan; and
- a second guide part that is disposed around the fan in the casing to send out air flowing out of the fan;

the first guide part and the second guide part are arranged coaxially with the fan and are configured to be rotatable with a position of the fan rotation shaft as a rotation center;

the first guide part and the second guide part are away from a wall that defines the air passage; and even though a rotation direction of the fan is a constant direction, the first guide part and the second guide part rotationally move to switch a direction of air blown by the fan.

5. The humidifier according to claim 1, wherein the cooling part is a heat exchanger that cools air by heat exchange between air flowing through an air passage through which air flows respectively at the time of adsorption and at the time of desorption, and outside air.

* * * * *